J. A. BIRSFIELD.
TRANSMITTER HINGE.
APPLICATION FILED MAR. 28, 1907.

No. 902,642.

Patented Nov. 3, 1908.

Witnesses:
Hazel C. Prado
David S. Hulfish

Jules A. Birsfield,
Inventor.
by McEwen & McEwen
Attorneys.

UNITED STATES PATENT OFFICE.

JULES A. BIRSFIELD, OF CHICAGO, ILLINOIS, ASSIGNOR TO ALFRED STROMBERG, OF CHICAGO, ILLINOIS.

TRANSMITTER-HINGE.

No. 902,642.  Specification of Letters Patent.  Patented Nov. 3, 1908.

Application filed March 28, 1907. Serial No. 364,988.

*To all whom it may concern:*

Be it known that I, JULES A. BIRSFIELD, a citizen of the United States of America, and a resident of Chicago, county of Cook, and State of Illinois, have invented a new and useful Improvement in Transmitter-Hinges, of which the following is a specification.

My invention pertains to hinges for telephone transmitters, and has as its object the production of a device of sightly construction providing a positive hinge and an ample clearance for the conductors passing through the hinge from the transmitter to the fixed terminals provided in the assembly of apparatus of which the transmitter forms a part.

This specification is accompanied by four figures, in which

Figure 1:
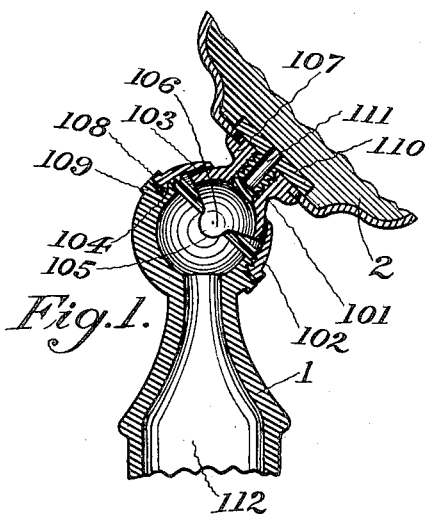
Figure 2:
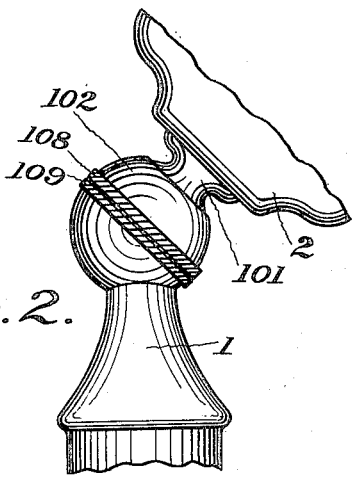
Figure 3:
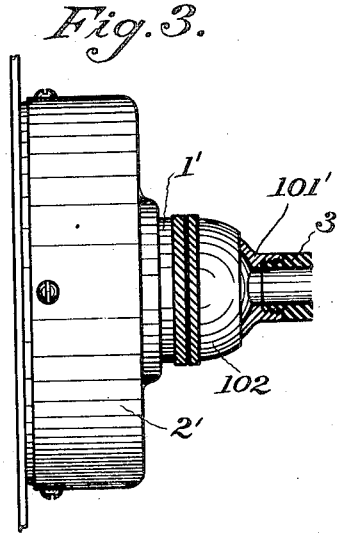
Figure 4:
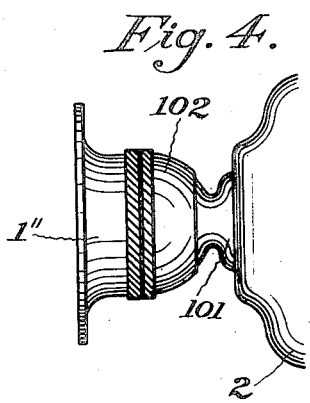

Figure 1 shows a section of my transmitter hinge joint as applied to the head of a desk stand; Fig. 2 shows elevation of same; Fig. 3 shows my hinge joint adapted to the requirements of an operator's breast transmitter, and Fig. 4 shows my hinge joint adapted to the requirements of a wall telephone equipment where the transmitter may be mounted upon the face of the box.

Referring to Fig. 1, the assembly of the device as a whole consists of the desk stand cap casting 1, bearing the transmitter 2. The hinge joint consists of three parts: first, a fixed or base part being in this instance the cap piece 1; second, a movable part 101; and third, a clamping member 102; a friction washer 103 also forms an essential feature of the completed hinge.

The casting 1, which is the base casting of the hinge joint, terminates in an annular lip 104 screwthreaded externally; at two points in this annular lip and diametrically opposite each other are semi-circular notches 105.

The second member of the hinge, namely, the movable member, is spherical in that portion of its external surface which is assembled adjacent to the part 1; the two projecting lugs 106 are adapted to engage the notches 105 of the part 1, and are cylindrical in their engaging surfaces, with radius approximately that of the notches 105 so that a smoothly working hinge is obtained. The spherical surface of the part 101 is concentric with the cylinder of the lugs 106 and therefore is revolved upon its center when the part 101 is revolved upon the axis of the lugs 106. The clamping ring 102 is spherical in that portion of its interior surface which engages the part 101, and it is further provided with internal screw threads to coöperate with the screw threads of the lip 104. The outer extension 107 of the part 101 is sufficiently small to pass through the clamping member 102, and assembly thus is made by placing the part 101 in position upon the part 1 with the lugs 106 in notches 105, and then passing the clamping ring 102 over the extension 107 and screwing it in place upon the lip 104 to clamp parts 1 and 101 together. Part 102 is knurled at 108 to facilitate the assembly, and part 1 is knurled at 109 to improve the appearance of the finished device. To secure a smooth hinge movement with uniform friction throughout its range, the leather washer 103 is placed within the clamping part 102 before that clamping part is assembled in position.

To mount the transmitter 2 upon the extension 107, the extension is drilled and tapped and a screw 110 having a broad flat head is passed through a perforation in the case of the transmitter 2 and screwed into the extension 107, clamping the transmitter 2 firmly in position. To give the transmitter a greater rigidity than would be secured by mere screw pressure, lugs upon the face of the extension 107 engage corresponding depressions or perforations in the case of the transmitter 2, thus providing an increased resistance to prevent the turning of the transmitter 2 upon the extension 107.

To provide for passing insulated electrical conductors to the working electrical portions of the transmitter 2, the screw 110 is bored at 111. The part 1 is cast hollow at 112. Passage for conductors thus is provided through the channel 111 and the channel 112, the opening through the hinge joint at 105 and 106 being of ample dimension to prevent crowding or twisting or unduly short bends in the insulated conductors either in the process of passing them into position or by reason of the operation of the hinge in service.

In Fig. 4 a modification is shown in the substitution of an alternative form of part 1; the part 1″ conforms to all the requirements of the part 1 but on the side distant from the hinge the part 1″ terminates in a flat face suitable for mounting upon the door of a bell box, or other mounting structure of telephone apparatus.

In Fig. 3, the hinge joint of my invention is shown installed between the transmitter 2′ of an operator's breast set and the mouthpiece 3 of the transmitter. The part 101' and mouthpiece 3 are shown in section. The transmitter case 2' has the integral projecting neck 1' upon which the mouthpiece 3 is hinged. This part is given the label 1' since, so far as a consideration of the hinge joint is concerned, it corresponds to part 1 of Figs. 1 and 2 and part 1'' of Fig. 4.

I do not wish to limit myself in all respects to the exact details herein illustrated and described, as I understand that modifications may be made without departing from the spirit or scope of my invention.

Having thus described my invention, what I claim as new and desire to secure by United States Letters Patent is:

1. A hinge comprising a movable member having a spherical convex surface, said surface being cut away to leave two diametrically opposite projections lying within the sphere of the surface; a fixed member engaged by the two projections of said movable member; and means for retaining said members in contact, substantially as described.

2. A hinge comprising a movable member having a spherical convex surface, said surface being cut away to leave two diametrically opposite projections lying within the sphere of the surface; a fixed member engaged by the two projections of said movable member; and a retaining ring having a spherical concave surface engaging the spherical surface of said movable member, substantially as described.

3. A hinge comprising a movable member having a spherical convex surface, said surface being cut away to leave two diametrically opposite projections lying within the sphere determined by the surface; a fixed member having two grooves for engagement by the projections of said movable member, the surface of the grooves and the surface of the projections being surfaces of revolution about the axis of the hinge; and means for holding said parts in contact, substantially as described.

Signed by me at Chicago, county of Cook and State of Illinois, in the presence of two witnesses.

JULES A. BIRSFIELD.

Witnesses:
DAVID S. HULFISH,
HARRIET L. SMITH.